US008663745B2

(12) United States Patent
Yano et al.

(10) Patent No.: US 8,663,745 B2
(45) Date of Patent: Mar. 4, 2014

(54) FILM-FORMING METHOD BASED ON LB METHOD

(75) Inventors: Koji Yano, Kawasaki (JP); Otto Albrecht, Atsugi (JP); Kunihiro Mitsutake, Yokohama (JP); Takeyuki Sone, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 13/105,974

(22) Filed: May 12, 2011

(65) Prior Publication Data

US 2011/0301315 A1  Dec. 8, 2011

(30) Foreign Application Priority Data

Jun. 4, 2010  (JP) .................................. 2010-129418

(51) Int. Cl.
*B05D 1/26* (2006.01)
*B29C 41/24* (2006.01)
*G02F 1/1337* (2006.01)
*C08F 138/00* (2006.01)

(52) U.S. Cl.
USPC ..................... 427/434.3; 427/434.5; 264/298; 349/124; 526/285; 528/502 C

(58) Field of Classification Search
USPC ........................ 526/285; 528/502 C; 349/124; 427/434.3, 434.5; 264/298
See application file for complete search history.

(56) References Cited

U.S. PATENT DOCUMENTS 5,599,589 A  2/1997  Albrecht et al.
6,166,386 A  12/2000  Yano et al.

FOREIGN PATENT DOCUMENTS

WO  WO 2008/047586 A1 *  4/2008

OTHER PUBLICATIONS

Schwiegk, T. et al., "On the origin of main chain orientation of rigid-rod macromolecules during the Langmuir-Blodgett process", Thin Solid Films, 210 (1992) pp. 6-8.
Albrecht, O. et al., "Control of the homogeneity of Langmuir-Blodgett films using the deposition-induced flow in the monolayer", Thin Solid Films, 221 (1992) pp. 276-280.
Albrecht, O. et al., "Helical polyacetylene-a conductive material for self-contained molecular electronic device use", Nanotechnology, vol. 19, (2008).

* cited by examiner

*Primary Examiner* — Fred M Teskin
(74) *Attorney, Agent, or Firm* — Fitzpatrick, Cella, Harper & Scinto

(57) ABSTRACT

Provided is a film-forming method based on an LB method by which a uniform alignment film using a helical polyacetylene can be obtained. The method based on the LB method includes: developing a helical polyacetylene onto a liquid surface; and transferring a monolayer film of the helical polyacetylene formed on the liquid surface onto a substrate to form a film, in which a compressibility P represented by the following formula (1) at a time of the film formation is $1 \times 10^{-2}$ m/mN or less: $P = (1/(dH/dS)) \times (1/S)$ (1), where H represents a surface pressure (mN/m) of the monolayer film of the helical polyacetylene, and S represents an area (m$^2$) of the monolayer film of the helical polyacetylene developed onto the liquid surface.

6 Claims, 12 Drawing Sheets

FILM-FORMING METHOD BASED ON LB METHOD

BACKGROUND OF THE INVENTION

1. Field of the Invention

The present invention relates to a film-forming method by which a uniform alignment film of a helical polyacetylene can be formed by means of an LB method.

2. Description of the Related Art

An alignment film is of high utility value for various optical elements because the film has an optical anisotropy, and the film shows different optical characteristics depending on its polarization directions. In addition, the alignment film has been utilized for providing an initial alignment of liquid crystal in a liquid crystal display. In addition, the mobility of a polymer to be utilized in the present invention can be improved by aligning its molecules toward the direction in which electrodes are bridged. As described above, the alignment film has become a technology of importance in industry.

As general methods of producing an alignment body of an organic polymer, there are given methods such as a rubbing substrate method and a grating substrate method involving: producing a substrate provided with an alignment-regulating force in advance; and producing the alignment body of the polymer on the substrate. Also given are methods such as an electric field alignment method, a magnetic field alignment method, a flow alignment method, and an epitaxial growth method involving applying an external force upon formation of an aggregate of the polymer to produce the alignment body. Further given are methods such as a stretching-rolling alignment method, a friction transfer method, and an optical alignment method involving: producing a non-alignment body of the polymer in advance; and applying an external force to the body to align the body.

In addition to those alignment-controlling methods, a method of producing a polymer alignment film based on an LB method is known. The LB method is an abbreviation for a Langmuir-Blodgett method. In addition, a film formed by the Langmuir-Blodgett method is referred to as an "LB film." The LB method or the LB film is detailed in "Langmuir-Blodgett Films" edited by G. Roberts, Plenum Press, New York (1990).

A monolayer of this kind which is floating on the surface of a liquid and exists at an interface between a gas and the liquid is referred to as a "Langmuir film" or an "L film." The gas is generally air, and the liquid is generally water. A typical example of the monolayer formed at the gas-liquid interface is formed on the surface of water by placing amphiphilic molecules each formed of a hydrophobic portion and a hydrophilic portion in ordinary air. Those molecules are orientated on the water surface with their hydrophilic portions directed toward the water surface and their hydrophobic portions directed toward the air to form a monolayer film. A representative example of any such molecule is stearic acid formed of a hydrophobic alkyl chain and a hydrophilic carboxylic acid. A thin film can be formed by transferring such monolayer films onto a substrate one by one. The method is the LB method, and the film thus formed is the LB film.

FIGS. 1A and 1B each illustrate a standard trough used in the LB method. FIG. 1B illustrates a sectional view taken along the line 1B-1B of FIG. 1A. A liquid bath 100 for storing a liquid generally has a width and a length of about 10 cm to 1 m. The liquid bath is typically filled with a liquid. Water 101 is typically used as the liquid. The shape of the surface of the liquid stored in the trough is a quadrangle three sides of which are formed of side surfaces of the trough and the other side of which is provided with a movable barrier 102. The movable barrier 102 is provided for compressing molecules developed onto the water surface, and its movement is controlled from the outside. A general method for the feedback control of the movable barrier is such that the two-dimensional pressure of each molecule developed onto the water surface, that is, a surface pressure is kept constant.

Molecules 103 are developed onto the water surface. In the conventional LB method, amphiphilic molecules each having a hydrophilic portion and a hydrophobic portion are used. Representative examples of the molecules include stearic acid molecules. An LB film is formed on a substrate 104. The substrate serves as a base substrate upon formation of the LB film, and is preferably flat. A typical material for the substrate is, for example, an Si substrate or glass. The size of the substrate is generally, but of course not limited to, about several millimeters to about several tens of centimeters.

Film formation is performed in the conventional, general LB method as described below.

First, the movable barrier 102 is made sufficiently distant in a −x direction illustrated in the figures. In this state, the molecules to form a film are spread onto the surface of the water 101. At this time, the molecules are generally spread by: dissolving the molecules in a volatile solvent or a water-soluble solvent in advance; and spreading the solution onto the water surface with a syringe or the like. When amphiphilic molecules are used as the molecules, a single molecular layer is formed at a gas-liquid interface, that is, the surface of the water 101. Next, the movable barrier 102 moves in an x direction illustrated in the figures to compress the molecules 103 on the water surface toward the substrate 104. At this time, the area of the spread of the molecules 103 developed onto the water surface can be understood from the position of the movable barrier 102. More specifically, the total area occupied by the molecules 103 developed onto the water surface can be determined from the product of a length represented by reference numeral 105 and a length represented by reference numeral 106.

Meanwhile, the surface pressure of water can be determined by installing, on part of the water surface, a pressure sensor for detecting the surface pressure. A relationship between the area and the surface pressure upon movement of the movable barrier 102 can be determined by plotting both the area and the surface pressure. This is a graph called a π-A curve in the LB method, and FIG. 2 illustrates a typical π-A curve. In FIG. 2, the axis of abscissa indicates the area represented by the product of the lengths represented by reference numerals 105 and 106, that is, the total area occupied by the molecules 103 developed onto the water surface, and the axis of ordinate indicates the surface pressure. When the molecules are spread, the movable barrier 102 is sufficiently distant in the −x direction, and the molecules are sparsely developed onto the water surface. Therefore, the surface pressure is nearly zero. Such surface pressure corresponds to a region represented by reference numeral 201 in the π-A curve of FIG. 2. In the region, even when the movable barrier 102 is moved in the x direction illustrated in the figures, the molecules are merely present on the water surface in a sparse fashion, and the surface pressure is kept zero. As the movable barrier 102 is further brought close to the substrate 104 in the x direction illustrated in the figures, the surface pressure abruptly increases around the time point when an area occupied per one molecule on the water surface exactly coincides with the actual area of the molecule. This is because the molecules are exactly brought into a state of being closely packed all over the surface. The abrupt increase corresponds to a point of inflection represented by reference numeral 202 in the π-A curve of FIG. 2.

When the movable barrier 102 is further moved in the x direction from the point, the surface pressure abruptly increases as illustrated in FIG. 2. This is a state where the movable barrier 102 pushes the molecules closely packed all over the water surface, and the molecules are compressed while maintaining a single-layer state on the water surface. The state corresponds to a region represented by reference numeral 203 in FIG. 2. When the movable barrier 102 is further moved in the x direction, the surface pressure further increases, and finally, the monolayer film structure maintained on the water surface breaks. The point corresponds to a point of inflection represented by reference numeral 204 in FIG. 2. When the movable barrier 102 is further moved in the x direction, the pressure does not change largely and the area per one molecule reduces, which corresponds to a state where the molecules developed onto the water surface cannot maintain the monolayer structure and hence the structure breaks. The state corresponds to a region represented by reference numeral 205 in FIG. 2. When the compression is further continued, the surface pressure increases again. This is because the molecules turn into multiple layers or a mass.

In the LB method, a film is formed on the substrate 104 while the exact pressure at which the molecules form a monolayer molecular film on the water surface is applied. That is, the film is formed on the substrate 104 with the region represented by reference numeral 203 as described below. The position of the movable barrier is controlled so that the surface pressure at which the π-A curve in FIG. 2 reaches the region represented by reference numeral 203 may be applied. A typical surface pressure is generally about several millinewtons per meter to about several tens of millinewtons per meter.

In the state, the substrate 104 is moved in a vertical direction, i.e., a z direction illustrated in the figures. As a result, the monolayer molecular film on the water surface is transferred onto the substrate 104. When the molecules developed onto the water surface are low-molecular weight molecules each formed of a hydrophilic portion and a hydrophobic portion, the molecules are orientated so that the hydrophilic portions may contact water and the hydrophobic portions may be directed toward the air (gas phase). When the substrate is hydrophobic, the substrate is placed in the air first. Then, the substrate is immersed in water by being moved in a −z direction in FIG. 1A so that the substrate may be perpendicular. At that time, the monomolecular layer developed onto the water surface is transferred onto the substrate 104, which is hydrophobic, so that the surface of the substrate and the hydrophobic portion of each of the molecules may contact each other.

Next, a second layer is formed by moving the substrate in the z direction illustrated in the figures. Thus, a molecular film with its thickness controlled at a single-layer level can be formed. In addition, when the substrate is hydrophilic, the substrate is immersed in water in advance. Then, the substrate is moved from the inside of water in the z direction so that the first layer may be laminated. In this case, the first layer is formed so that the hydrophilic substrate and the hydrophilic portion of each of the molecules may contact each other. Hereafter, the second layer is laminated by moving the substrate in the −z direction. Generally employed in the LB method is such a method involving vertically moving the substrate placed perpendicularly to form a film as described above. Also available is a method involving placing the surface of the substrate parallel to the water surface and bringing the surface of the substrate into contact with the water surface from above the water surface to transfer the molecules on the water surface onto the substrate, or a method involving lifting upward the substrate placed below the water surface with its direction kept parallel to the water surface to transfer the molecules on the water surface onto the substrate in such a manner that the molecules are skimmed.

Although amphiphilic, low-molecular weight molecules such as arachidic acid are used in the most general LB method, a method involving the use of high-molecular weight molecules is also available. In this case, not all high-molecular weight molecules can form a monolayer film on a water surface or liquid surface, and only high-molecular weight molecules of which the monolayer film can be formed can be formed into a film by employing the LB method.

In an ordinary LB method or LB film, layers are laminated one by one, and hence the structure of the film can be controlled in a direction perpendicular to a lamination surface. Although a structure in one layer is hard to control in ordinary cases, the structure can be controlled to some extent by utilizing the flow of a monolayer film developed onto a water surface. FIGS. 3A to 3C each illustrate the movement of a monolayer film developed onto a water surface when the monolayer film on the water surface is transferred onto a substrate in the LB method, the movement being viewed from above an LB trough. The LB trough illustrated in each of FIGS. 3A to 3C is substantially the same as that illustrated in FIG. 1A, but differs from that illustrated in FIG. 1A in that a similar movable barrier 301 as well as the movable barrier 102 is provided. The movable barrier 301 moves in the direction opposite to that of the movable barrier 102 in the x direction. That is, when the movable barrier 102 moves in the x direction, the movable barrier 301 moves in the −x direction. In this case, the front side and rear side of the substrate 104 are symmetric with respect to each other, and hence films can be uniformly formed on both surfaces of the substrate 104.

FIGS. 3A to 3C each illustrate the movement on the water surface when a film is formed on the substrate 104, and time elapses as illustrated in FIG. 3A, FIG. 3B, and FIG. 3C in the stated order. In each figure, meshes and lattice points represent the same points on the water surface, and each represent the manner in which the corresponding point has moved. It can be understood that as the time elapses as illustrated in FIGS. 3A, 3B, and 3C in the stated order, the meshes deform by virtue of the flow of the water surface. In the vicinity of the substrate 104, the meshes each deform from a rectangular shape to a shape elongated in the x direction illustrated in the figures by virtue of the flow.

When a monolayer of a polymer is arranged on the water surface, the polymer is aligned so as to elongate in the x direction illustrated in the figures in the vicinity of the substrate by virtue of the flow as the time elapses. Since the layer is transferred onto the substrate while maintaining the alignment, a film in which the polymer is aligned is formed on the substrate. The polymer is aligned so as to elongate in the z direction illustrated in the figures on the substrate, and hence the film is transferred and formed. As described above, an alignment film can be formed by utilizing a flow in the LB method. The flow alignment is described in, for example, S. Schwiegk, et al., "With Regard to Origin of Main-chain Alignment of Rigid, Rod-like Polymer during Langmuir-Blodgett Process," Thin Solid Films, 210 (1992) 6, or O. Albrecht, et al., "Control of Uniformity of Langmuir-Blodgett Film Using Lamination-induced Flow in Monolayer," Thin Solid Films, 221 (1992) 276.

SUMMARY OF THE INVENTION

As described above, a film having additionally high uniformity has been requested of a method of producing an alignment film involving the use of a polymer, and an additionally high deposition speed has also been requested of the method. The present invention provides solutions to the problems.

The present invention provides a film-forming method based on an LB method by which a uniform alignment film using a helical polyacetylene can be obtained.

A film-forming method based on an LB method which solves the above-mentioned problems includes: developing a helical polyacetylene onto a liquid surface; and transferring a monolayer film of the helical polyacetylene formed on the liquid surface onto a substrate to form a film, in which a compressibility P represented by the following formula (1) at a time of the film formation is $1 \times 10^{-2}$ m/mN or less.

$$P = (1/(dH/dS)) \times (1/S) \tag{1}$$

(In the formula, H represents a surface pressure (mN/m) of the monolayer film of the helical polyacetylene, and S represents an area (m$^2$) of the monolayer film of the helical polyacetylene developed onto the liquid surface.)

According to the present invention, there can be provided a film-forming method based on an LB method by which a uniform alignment film using a helical polyacetylene can be obtained. In addition, the present invention enables film formation at a higher speed than that of a conventional film-forming method.

In addition, according to the present invention, a free standing film of a helical polyacetylene film that can be utilized as, for example, an optical thin film or gas-permeable film can be produced.

Further features of the present invention will become apparent from the following description of exemplary embodiments with reference to the attached drawings.

DESCRIPTION OF THE EMBODIMENTS

Figure 1A:
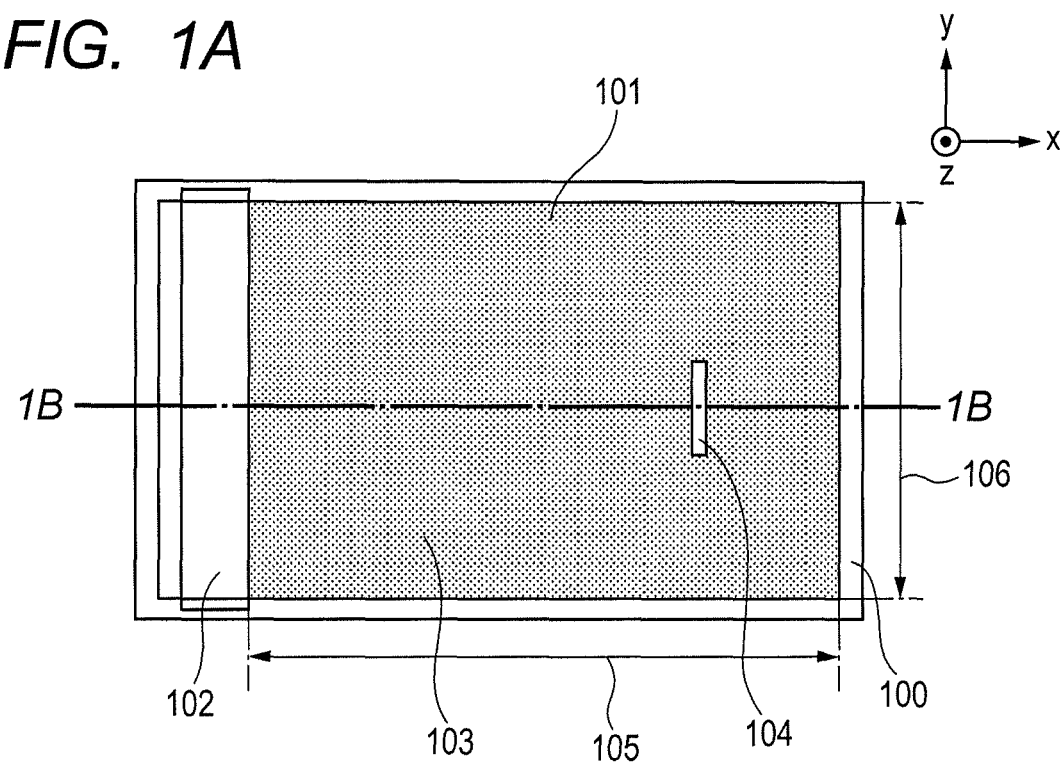
FIGS. 1A and 1B are each a schematic view illustrating a trough used in a general LB method.

Hereinafter, an embodiment of the present invention is described in detail.

The film-forming method based on an LB method according to the present invention includes: developing a helical polyacetylene onto a liquid surface; and transferring a monolayer film of the helical polyacetylene formed on the liquid surface onto a substrate to form a film, in which a compressibility P represented by the following formula (1) at a time of the film formation is $1 \times 10^{-2}$ m/mN or less.

$$P = (1/(dH/dS)) \times (1/S) \tag{1}$$

(In the formula, H represents a surface pressure (mN/m) of the monolayer film of the helical polyacetylene, and S represents an area (m$^2$) of the monolayer film of the helical polyacetylene developed onto the liquid surface.)

The features of the film-forming method based on the LB method according to the present invention, which enables film formation by a method substantially the same as a conventional, general LB method, lie in that an alignment film using the helical polyacetylene is obtained and that the compressibility P at the surface pressure H at which the film formation is performed is $1 \times 10^{-2}$ m/mN or less.

In the present invention, the helical polyacetylene as a rigid, linear polymer is used for obtaining an alignment film. The rigid, linear polymer is such a molecule as to maintain a linear shape when a single molecule is taken out. A specific method of observing a molecular shape is, for example, a method involving: dispersing the polymer onto a substrate with a sufficiently dilute solution of the polymer by spin coating or the like; and imaging the resultant with a scanning probe microscope (SPM) such as an atomic force microscope (AFM) to observe the molecular shape. A polymer that was actually confirmed to be linear by such method is, for example, a helical polyacetylene described in the document by O Albrecht, T Sone, A Kuriyama, K Eguchi, and K Yano, "Nanotechnology," vol. 19, p. 505201 (2008).

A helicalhelical, substituted polyacetylene used in the present invention is described. The helical, substituted polyacetylene is a monosubstituted polyacetylene represented by the following structural formula (1), and is, for example, a compound whose main chain has a helical structure.

X and Y in the formula each represent a chain or cyclic hydrocarbon, or instead, a substituent having a heteroatom or a metal atom. The structure of helical, substituted polyacetylene has only to have an unconjugated functional group on any one of the positions in a side chain, such as an alkyl group, a halogenated alkyl group, an alkylene oxide chain, a substituted or unsubstituted cycloalkyl group, or an unconjugated hetero ring.

Examples of X include a substituted or unsubstituted aromatic ring, a hetero aromatic ring, a carbonyl bond, an ester bond, an ether bond, a carbonate bond, an amide bond, an imino bond, a urethane bond, a phosphate bond, a thioether bond, a sulfinyl group, a sulfonyl group, an amino group, a silyl group, an alkylene oxide chain of any length, and other cyclic or chain hydrocarbons. X may be substituted by single Y, or may be substituted by a plurality of Y's identical to or different from each other.

Examples of Y include, in addition to the chemical species described for X in the foregoing, a halogen atom, a hydroxyl group, a carboxyl group, a nitro group, a cyano group, a vinyl group, and an ethynyl group. In addition, Y may be substituted by any of those chemical species.

The unconjugated functional group has only to be contained in Y. When X is substituted by a plurality of Y's different from each other, the unconjugated functional group has only to be contained in any one of Y's. Examples of the unconjugated functional group include an alkyl group, a halogenated alkyl group, a halogen, a methylene chain, an alkylene oxide chain, a substituted or unsubstituted cycloalkyl group, and an unconjugated hetero ring.

Figure 4:
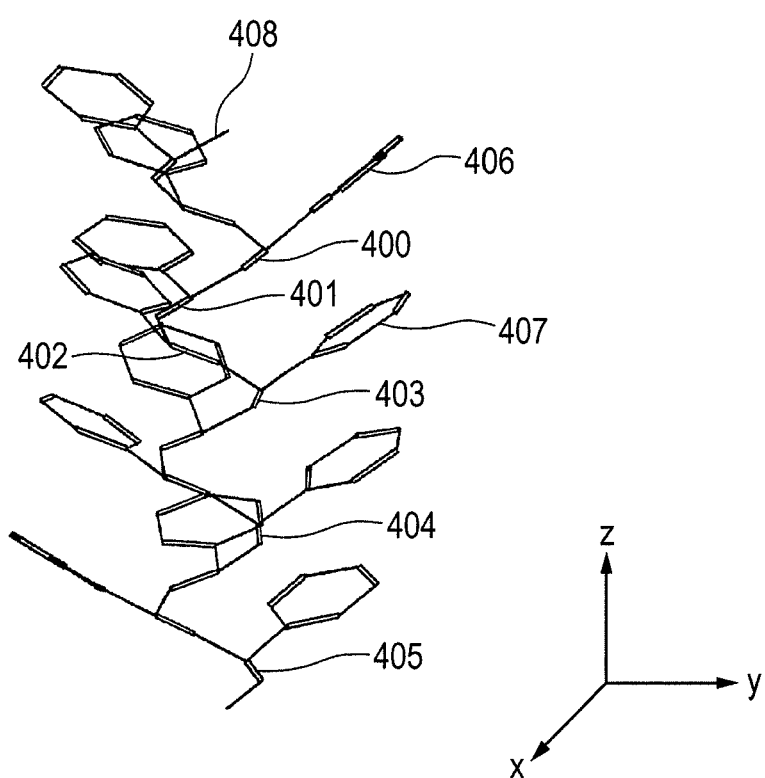
FIG. 4 is a view describing the structure of a helical polyacetylene.
Figure 5:
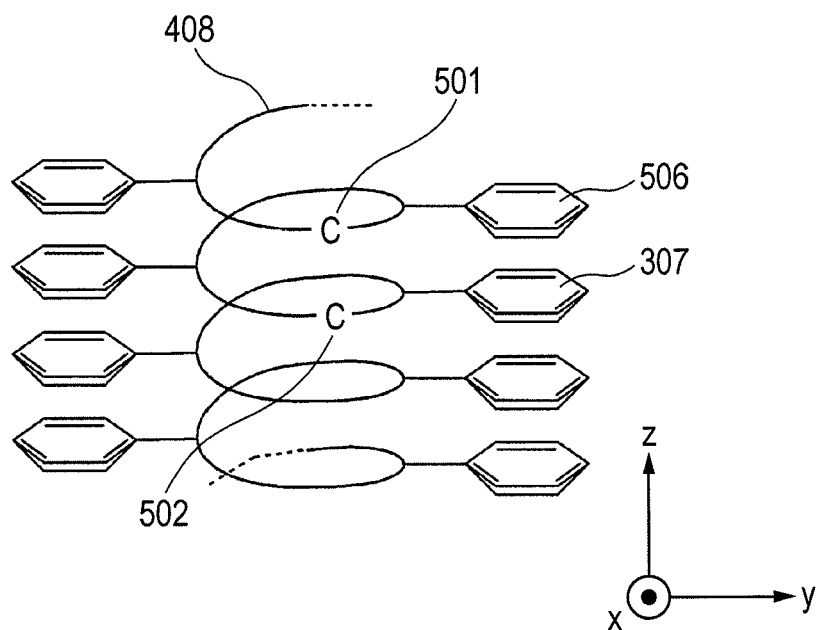
FIG. 5 is a view describing the structure of the helical polyacetylene.
Figure 6:
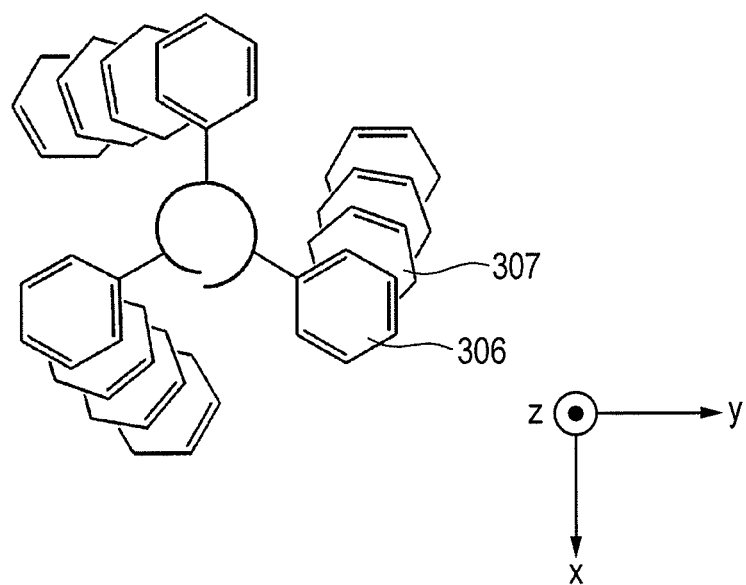
FIG. 6 is a view describing the structure of the helical polyacetylene.

The main chain of alternating double bonds of the helical, substituted polyacetylene has the same primary structure as that of a non-helical, substituted polyacetylene. However, the helical, substituted polyacetylene has a substituent larger than a hydrogen atom, and hence its main chain is not of a planar structure but forms a sterically distorted structure. FIGS. 4 to 6 each illustrate the structure of the helical, substituted polyacetylene used in the present invention. FIGS. 4 to 6 each illustrate phenylacetylene as one helical polyacetylene as an example. As illustrated in FIG. 4, the main chain of the helical polyacetylene forms a helical structure in which alternating double bonds are distorted, and the helical structure is a structure close to a 3/1 helical that rotates substantially once through three units, i.e., a double bond 400, a double bond 401, and a double bond 402.

In the structure, a double bond 403 distant from the double bond 400 by one winding is arranged substantially parallel to the double bond 400 at an interval of typically 0.5 nm (5 Å) or less and more typically about 0.2 nm to 0.4 nm (2 to 4 Å). The double bond 403 and the double bond 404, and the double bond 404 and the double bond 405, are similarly in tandem with each other vertically at a helical periodic interval. FIG. 5 illustrates, in a helical fashion, a main chain 408 including the double bonds 400 to 405 for an easy understanding. Although the illustration of FIG. 5 is such that two side chains are added every time the main chain rotates once for the avoidance of complexity, substantially three side chains are added per one rotation in an actual structure as illustrated in FIG. 4.

In FIG. 5, two carbon atoms 501 and 502 are included in the main chain 408. The two carbon atoms are positioned so as to be distant from each other by one rotation of the helical structure of the main chain 408, and form such a structure as to be laminated in a direction illustrated in the figure. Phenyl groups 406 and 407 are present in side chains, and adopt such a structure as to be stacked after substantially one rotation of the main chain. Further, FIG. 6 illustrates the structure of a molecule of the helical, substituted polyacetylene used in the present invention when viewed from a z direction. In addition, the above-mentioned periodic structure is formed in the helical, substituted polyacetylene used in the present invention over a long distance. The distance typically ranges from one nanometer to several micrometers, and the entire molecule shows a linear shape in the region in the z direction illustrated in the figure.

Figure 1B:
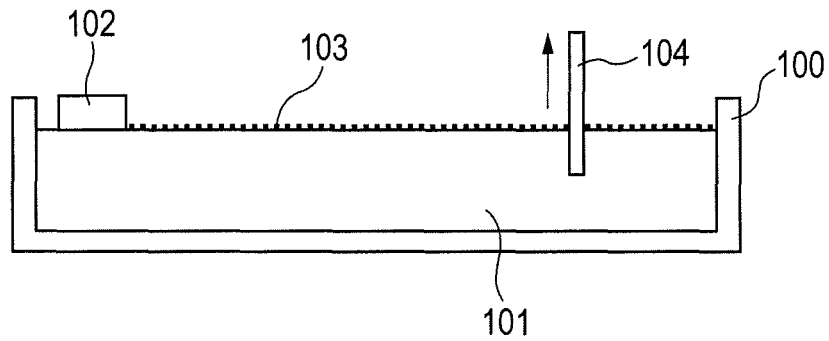

Such trough used in the general LB method as illustrated in each of FIGS. 1A and 1B is used for carrying out the present invention. Although a method involving developing target molecules onto a water surface most general in the LB method is described as a mode for carrying out the present invention, a liquid to be used may be changed as required to such an extent that the liquid does not dissolve the target molecules. In addition, the case where an ambient atmosphere is air most general in the LB method is described as an example, but film formation may be performed in any other gas as required.

Figure 7A:
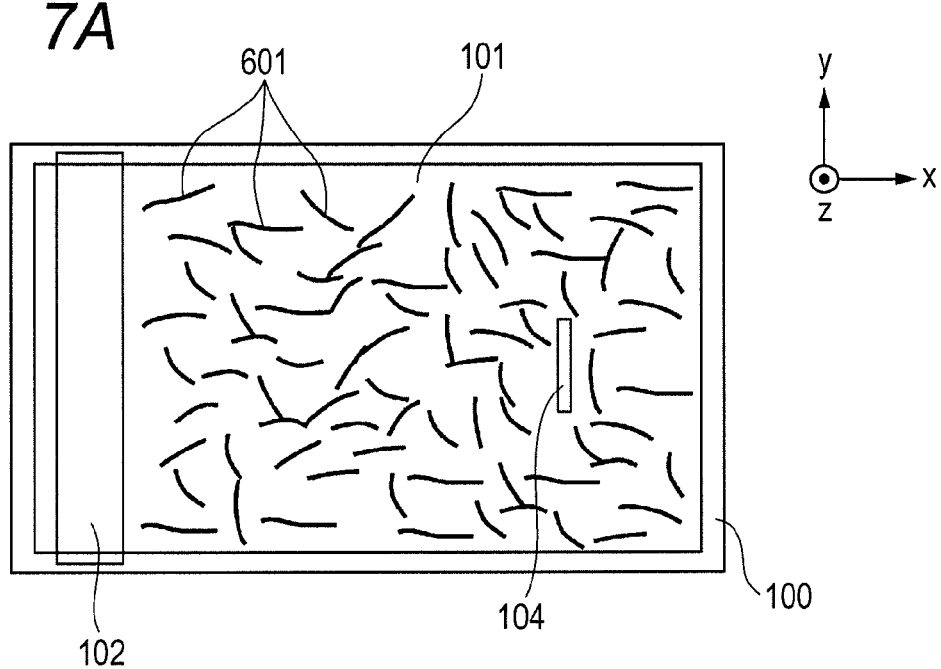
FIGS. 7A and 7B are each a view illustrating a method of producing an alignment film based on an LB method involving the use of the helical polyacetylene as a rigid, linear polymer.
Figure 7B:
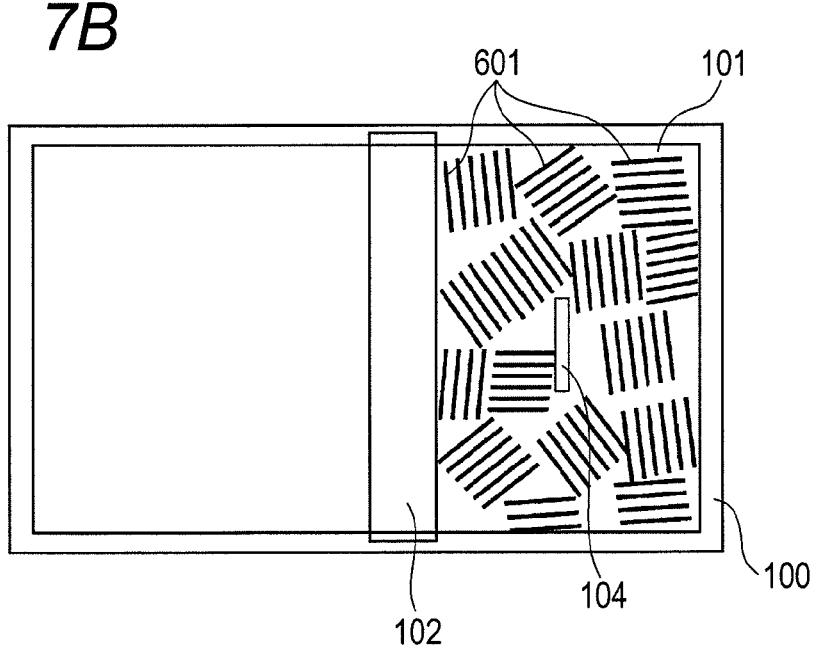

FIGS. 7A and 7B are each a view describing the film-forming method according to the present invention involving the use of the trough illustrated in each of FIGS. 1A and 1B. First, the movable barrier 102 is moved in a −x direction illustrated in the figures so as to be sufficiently distant from the substrate 104. The polymer is dispersed onto the water surface in the state. The molecules of the helical polyacetylene are such rigid, linear molecules because the main chain of each of the molecules adopts a helical structure and the entire molecule is easily kept linear.

In the present invention, the helical polyacetylene as a rigid, linear polymer is spread onto the water 101. The molecules of the helical polyacetylene are dissolved in a solvent in advance because it is actually difficult to directly spread the polymer onto the water surface. Examples of the solvent include methanol, ethanol, acetone, xylene, and chloroform. When the solution in which the polymer is dissolved is dribbled onto the water surface, the solvent evaporates or dissolves in water, and as a result, the polymer extends on the water surface. FIG. 7A illustrates the manner of the extension. In each of FIGS. 7A and 7B, a rigid, linear polymer 601 is schematically illustrated with a line, and the length of the line is substantially equal to the size of the substrate 104 or the like. However, each molecule is illustrated in a strictly schematic fashion, and the actual length of the molecule is typically about several nanometers to several micrometers. In the state, the molecules of the polymer 601 are sparsely present on the water surface.

Figure 2:
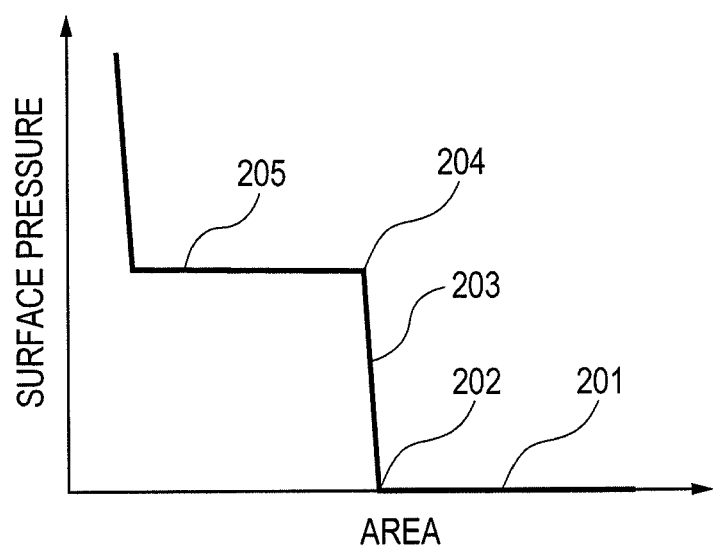
FIG. 2 is a view illustrating a π-A curve in the general LB method.
Figure 8:
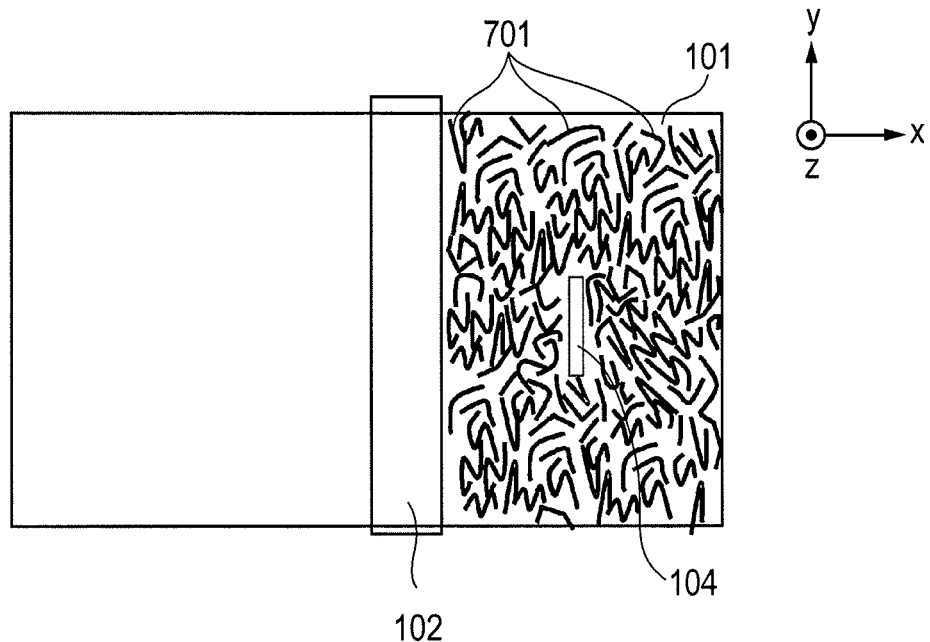
FIG. 8 is a view illustrating an LB method involving the use of an ordinary polymer.

Even in the LB method based on the present invention, a curve similar to the π-A curve illustrated in FIG. 2 is obtained, and such state where the molecules are sparsely present on the water surface as described above corresponds to the region represented by reference numeral 201 in FIG. 2. Next, the movable barrier 102 is moved in an x-axis direction. As a result, intervals between the molecules on the water surface narrow. Thus, a closely packed monolayer film, that is, a helical polyacetylene polymer monolayer film is formed. FIG. 7B illustrates the manner in which the film is formed. The thickness of the polymer monolayer film is the diameter of the polymer. The molecules of the helical polyacetylene tend to be easily arranged so as to be parallel to each other when compressed because the molecules are each a rigid, linear polymer. An alignment domain is easily formed as described above. Such state where the molecules are exactly packed as described above corresponds to the state represented by reference numeral 202 in FIG. 2, and an area occupied per one molecule on the water surface is exactly the same as the area of the molecule. On the other hand, an ordinary polymer is not rigid, and hence an alignment domain is hardly formed. FIG. 8 illustrates the manner in which the ordinary polymer behaves.

Next, the movable barrier 102 is moved in the x direction illustrated in the figures. As a result, a surface pressure abruptly increases because the molecules are packed on the water surface while maintaining the monomolecular layer to reduce the area occupied by the molecules. The abrupt increase corresponds to the region represented by reference numeral 203 in FIG. 2. When the movable barrier 102 is further moved in the x direction, the monolayer film starts to be broken. The point is the point represented by reference numeral 204 in FIG. 2. When the movable barrier 102 is further moved in the x direction illustrated in the figures, the molecular film on the water surface is broken. The region corresponds to the region represented by reference numeral 205. In the LB method according to the present invention, film formation is performed in the region represented by reference numeral 203 in FIG. 2 (region where a ratio of an increase in surface pressure to a reduction in area is sharp) as in the case of the ordinary LB method.

In the film-forming method based on an LB method of the present invention, film formation is performed at such a surface pressure that a compressibility P of the monolayer film of the helical polyacetylene represented by the following formula (1) shows $1\times10^{-2}$ m/mN or less.

$$P=(1/(dH/dS))\times(1/S) \qquad (1)$$

(In the formula, H represents a surface pressure (mN/m) of the monolayer film of the helical polyacetylene, and S represents an area (m$^2$) of the monolayer film of the helical polyacetylene developed onto the water surface. In addition, L represents a length represented by reference numeral 105 in FIG. 1A, that is, the length of the molecular film developed onto the water surface in the direction in which the barrier moves.)

The term "compressibility" refers to a reduction in the area occupied by the molecules when a pressure is applied to the monolayer film from the outside of the film. The compressibility can be determined by dividing the reciprocal of the gradient of the π-A curve of FIG. 2 in the region represented by reference numeral 203 in the curve by the area. The compressibility P is determined in the unit of m/mN from the area S (m$^2$) and the surface pressure H (mN/m) indicated by the axis of abscissa and the axis of ordinate in the π-A curve of FIG. 2, respectively according to the formula (1). The compressibility represents the elastic property of the molecular film developed onto the water surface. That is, the compressibility changes depending on, for example, the kinds, purities, and temperatures of the rigid, linear molecules used in the film. A lower compressibility means a smaller amount in which the film deforms when a pressure is applied in the direction horizontal to the film. That is, a smaller compressibility means that the film itself is of a more rigid nature. For example, a smaller compressibility means that the molecules themselves are more rigid or that when the molecules are turned into a film, the film has a smaller number of voids and the molecules are in a state of being more closely packed.

In the present invention, film formation is performed at such a surface pressure that the compressibility of the monolayer film of the helical polyacetylene shows a value of $1\times10^{-2}$ m/mN or less. The inventors of the present invention have found that the film quality and uniformity of a formed LB film largely differ at a compressibility at the surface pressure at which the film formation is performed of $1\times10^{-2}$ m/mN as a boundary.

Effective approaches to achieving a compressibility of $1\times10^{-2}$ m/mN or less are, for example, the control of the structure of the helical polyacetylene, an increase in the purity of the polyacetylene, and the suppression of the molecular weight dispersity of the polyacetylene.

From the viewpoint of the control of the structure, a material whose molecules themselves each have high rigidity is desirably adopted. For example, a monosubstituted, helical polyacetylene represented by the following structural formula (2) provided with a propiolate-containing substituent at a side chain thereof has high rigidity, and hence a compressibility as low as $1\times10^{-2}$ m/mN is easily obtained.

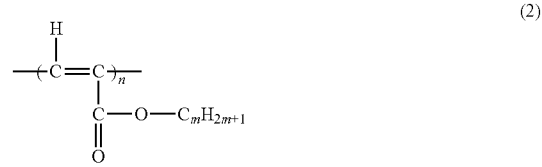

(2)

(In the formula, m and n each represent an integer.)

In addition, the film formation is desirably performed immediately after polymerization because some polymers show increases in their compressibilities after a lapse of a time of, for example, about three months from the polymerization of the polymers even when the polymers each have a compressibility of $1\times10^{-2}$ m/mN immediately after their polymerization.

In addition, the compressibility tends to reduce as the molecular weight dispersity reduces, provided that an upper limit for the molecular weight dispersity for obtaining a compressibility of $1\times10^{-2}$ m/mN varies from material to material.

For example, a material having a molecular weight dispersity (Mw/Mn) of 5 or less is desirable. However, polyethyl propiolate can provide a compressibility of $1\times10^{-2}$ m/mN or less even when its molecular weight dispersity exceeds 5.

Figure 3A:
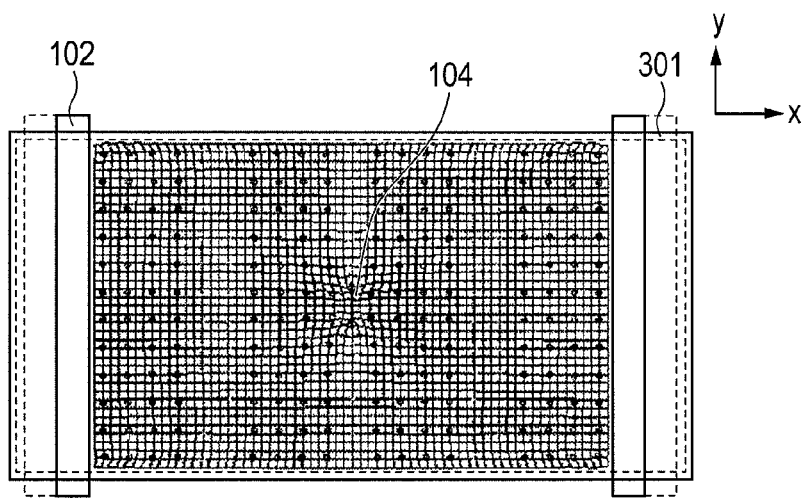
FIGS. 3A, 3B, and 3C are each a view describing alignment by an LB method.
Figure 3B:
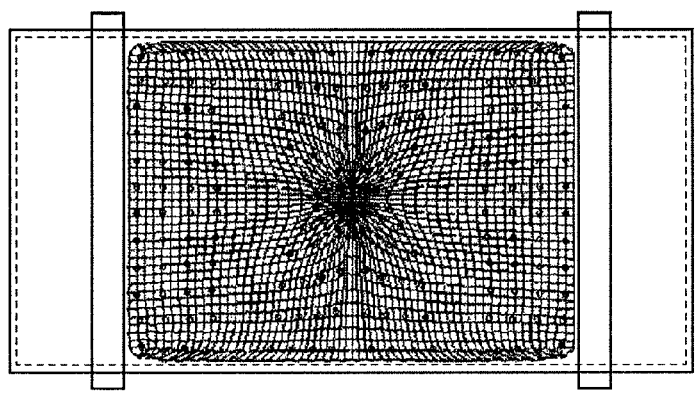
Figure 3C:
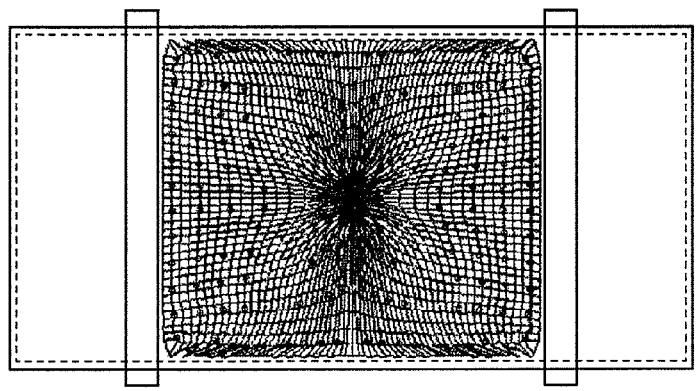

The film-forming method of the present invention is the same as the LB method for a polymer described in the section "Description of the Related Art." The movable barrier 102 is moved so that a specified surface pressure may be obtained. After that, the substrate 104 is moved in the z direction while the movable barrier 102 is moved in the x direction illustrated in the figures so that the surface pressure may be kept at the specified value. At that time, the helical polyacetylene as rigid, linear molecules on the water surface is transferred onto the substrate 104. In this case, the water surface shows the same movement as that illustrated in each of FIGS. 3A to 3C in the section "Description of the Related Art." The molecules are arranged in the x-axis direction illustrated in the figures in the vicinity of the substrate 104 by the movement of the water surface. Then, the molecules are transferred onto the substrate 104. Therefore, the molecules are aligned in the z direction on the substrate 104.

Next, film formation at such a pressure that the compressibility shows a value of $1\times10^{-2}$ m/mN or less as a requirement of the present invention is described.

Figure 9:
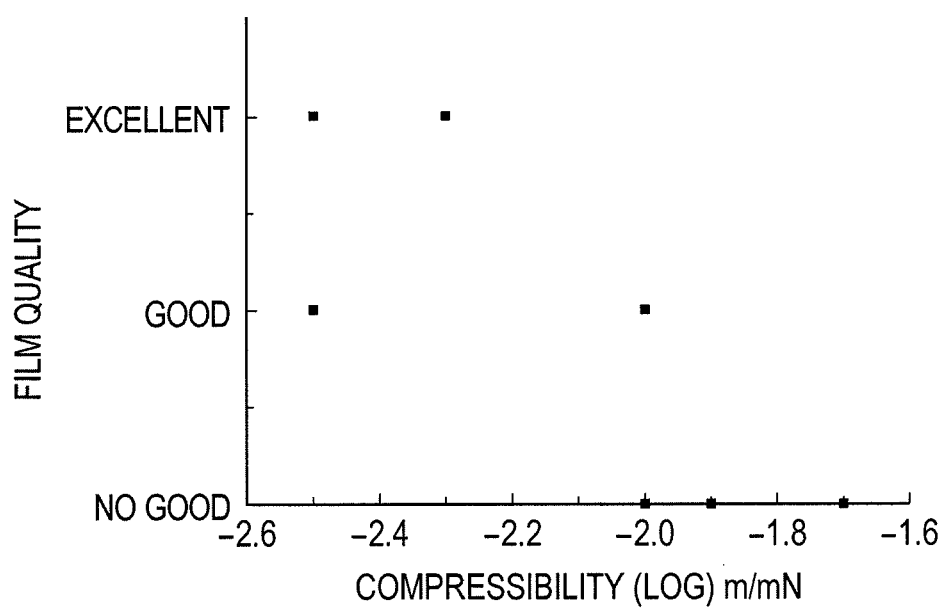
FIG. 9 is a view illustrating a relationship between a compressibility at a pressure at the time of film formation and the film quality of a formed LB film.

FIG. 9 is a view illustrating a relationship between a compressibility at a pressure at the time of the film formation and the film quality of a formed LB film. The axis of abscissa indicates the compressibility at the pressure at which the film formation is performed (on a logarithmic scale in base 10 in the unit of m/mN). For example, a compressibility (Log) of −2.0 is equal to $10^{-2.0}$ m/mN, i.e., $1.0\times10^{-2}$ m/mN, and a compressibility (Log) of −2.2 is equal to $10^{-2.2}$ m/mN, i.e., $6.3\times10^{-2}$ m/mN.

Figure 10A:
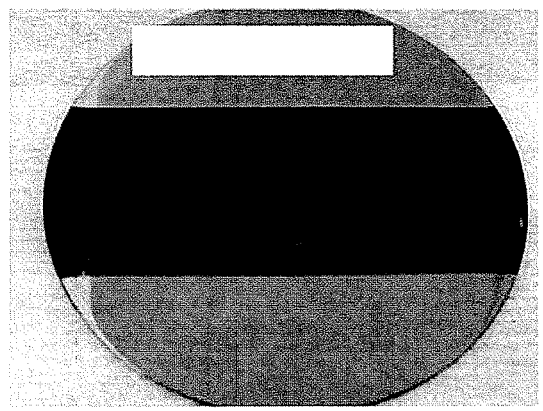
FIGS. 10A and 10B are photographs showing thin films of LB films evaluated as being excellent and good.
Figure 10B:
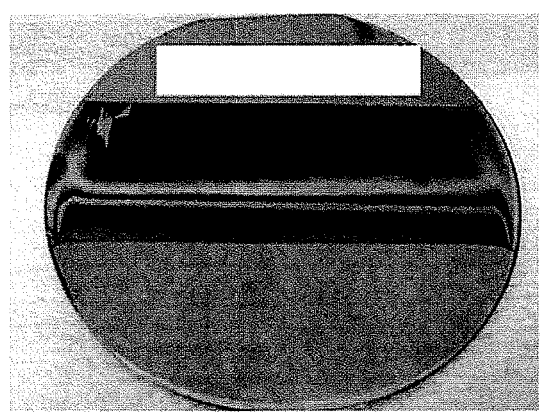

In the axis of ordinate, formed LB films are classified into three categories, i.e., "excellent," "good," and "no good" depending on the film qualities of their surfaces. The term "excellent" refers to the case where a film is formed with good uniformity over its entire surface, the term "good" refers to the case where such a film that nonuniformity partially exists but one half or more of an entire region is uniform is formed, and the term "no good" refers to the case where an entirely nonuniform film is formed or no film formation can be performed. FIGS. 10A and 10B are photographs showing thin films of LB films evaluated as being excellent and good. FIG. 10A shows the photograph of the LB film evaluated as being excellent, and FIG. 10B shows the photograph of the LB film evaluated as being good. The structure that appears to be a fringe in FIG. 10B is due to a difference in interference color resulting from the nonuniformity of a thickness.

Figure 11:
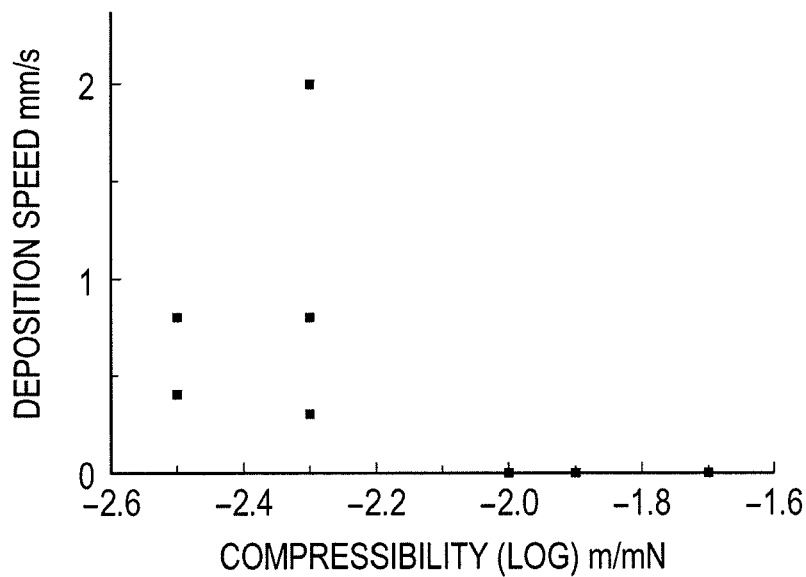
FIG. 11 is a graph illustrating a relationship between a compressibility at a pressure at the time of film formation and a deposition speed.

FIG. 11 illustrates a graph illustrating a relationship between a compressibility at a pressure at the time of the film formation and a film-formable speed. In FIG. 11, the axis of abscissa is the same as that of FIG. 9, and indicates the compressibility at the pressure at which the film formation is performed (on a logarithmic scale in base 10 in the unit of m/mN). The axis of ordinate indicates the film-formable speed calculated as described below. Upon formation of an LB film, the movable barrier 102 is moved in the x direction illustrated in the figures while a pressure is kept constant. Then, the substrate 104 is vertically moved in sync with the above-mentioned movement. When the movement of each of the movable barrier 102 and the substrate 104 is made quick, the movement of the monolayer film developed onto the water surface cannot follow the movement, and as a result, such feedback control that the pressure is kept constant cannot be performed. The critical speed is defined as the film-formable speed. As the uniformity of the monolayer film on the water surface becomes higher, a movement when an end of the film is pushed by the movable barrier 102 propagates more quickly to the entirety of the monolayer film, and hence the film-formable speed increases. As the film-formable speed increases, the uniformity of the LB film formed on the substrate 104 becomes higher because the formed LB film is of such a structure that the monolayer film on the water surface is transferred. In addition, the film formation can be performed at a higher speed as the film-formable speed increases. The higher film-formable speed involves the following merit. A flow in the vicinity of the substrate 104 can be made more significant, and hence alignment property is improved. Of course, the higher film-formable speed involves the following merit as well. The actual deposition speed increases, and hence productivity is improved.

As can be seen from FIG. 9, a film with good uniformity is formed in a region where the compressibility is $1 \times 10^{-2}$ m/mN or less. In addition, as can be seen from FIG. 11, the deposition speed abruptly increases in a region where the compressibility is $1 \times 10^{-2}$ m/mN or less. In the present invention, an alignment film can be formed with good uniformity at a high speed when the film formation is performed at such a surface pressure that the compressibility is $1 \times 10^{-2}$ m/mN or less. Further, a film having high alignment property can be obtained.

It should be noted that not all materials have such a pressure that the compressibility is $1 \times 10^{-2}$ m/mN or less. In order that the present invention may be realized, the presence of such pressure that the compressibility is $1 \times 10^{-2}$ m/mN or less is confirmed by, for example, measuring a π-A curve. It should be noted that screening can be performed without any actual formation of an LB film by checking whether or not the presence of such pressure that the compressibility is $1 \times 10^{-2}$ m/mN or less is confirmed in advance.

Example 1

An example in which a film was formed on an Si substrate with poly(propylpropiolate) by an LB method is described as Example 1.

A trough used in the LB method is a general LB trough, and the film formation was performed by the LB method involving the use of water. The poly(propylpropiolate) is a monosubstituted, helical polyacetylene represented by the following structural formula (3).

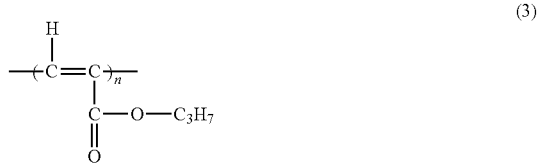

(3)

The poly(propylpropiolate) can be obtained by polymerizing n-propylpropiolate as a monomer. Specifically, synthesis was performed as described below. 47 Milligrams of rhodium (norbornadiene) chloride dimer and 2.6 ml of methanol were loaded into a test tube, and then a mixed liquid of 0.5 g of n-propyl propiolate and 2.5 ml of methanol was injected into the mixture with a syringe so that a polymerization reaction might be initiated. The reaction was performed at 40° C. for 24 hours. The precipitated polymer was washed with methanol and filtrated. After that, the resultant was dried in a vacuum. Thus, the target product was obtained. The number-average molecular weight (Mn) and molecular weight dispersity (Mw/Mn) of the polymer evaluated by GPC were $2.4 \times 10^4$ and 2.6, respectively.

Figure 12:
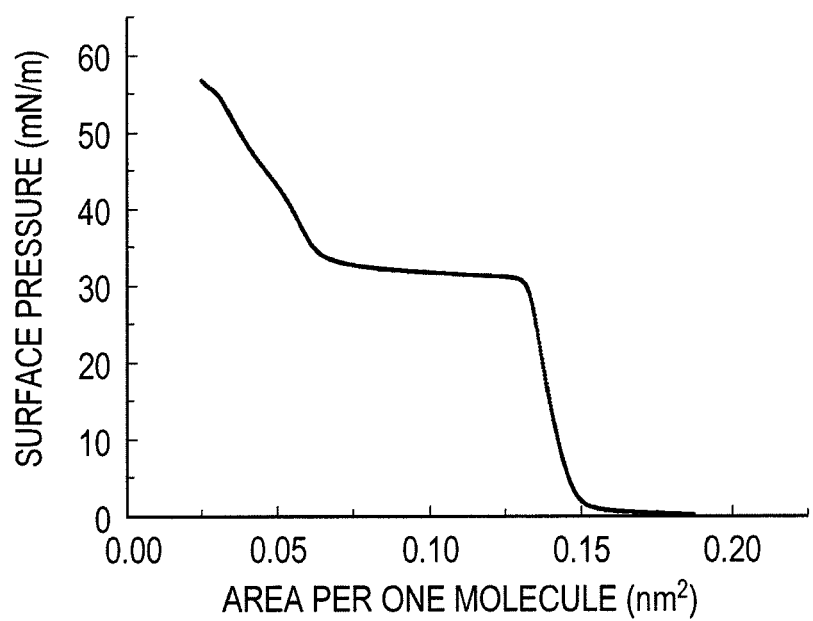
FIG. 12 is a view illustrating the π-A curve of Example 1.

Next, a solution of the pol(ypropylpropiolate) thus polymerized in chloroform was prepared, and then the solution was dropped onto the water surface of the LB trough with a syringe. After that, a π-A curve was acquired while a barrier was moved. Thus, a graph illustrated in FIG. 12 was obtained. In FIG. 12, the axis of abscissa indicates an area (nm²) occupied per one molecule, and the axis of ordinate indicates a surface pressure (mN/m). A curve similar to the π-A curve illustrated in FIG. 2 was obtained.

The surface pressure was measured with a surface pressure sensor placed in the vicinity of a substrate at the temperature at which the film formation was performed, i.e., room temperature (about 20° C.).

Figure 13:
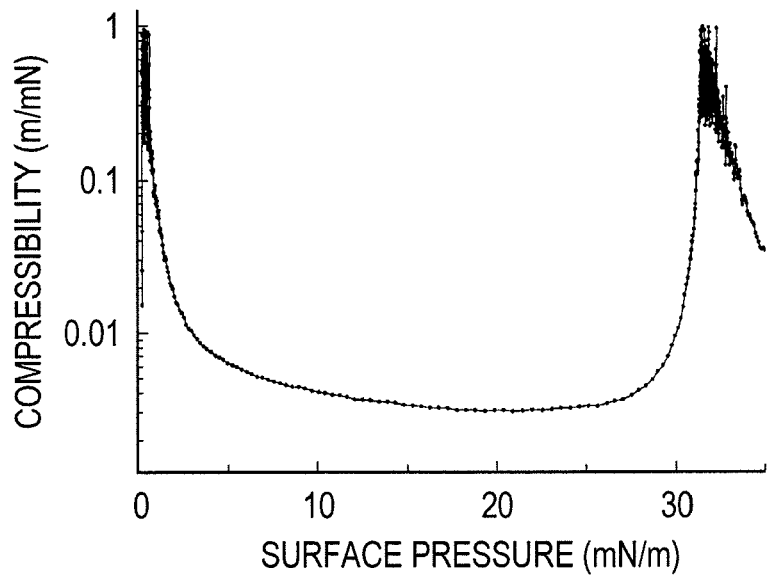
FIG. 13 is a graph illustrating a relationship between a surface pressure and a compressibility in Example 1.

The points of inflection represented by reference numerals 202 and 204 in FIG. 2 appear at 0.15 nm² and 0.13 nm² on the axis of abscissa in FIG. 12, respectively. A compressibility can be determined from the π-A curve by the method described in the foregoing. FIG. 13 illustrates a graph obtained by: determining a compressibility at each point from the π-A curve illustrated in FIG. 12; and plotting the compressibility against the surface pressure. In the graph of FIG. 13, the axis of abscissa indicates the surface pressure (mN/m), and the axis of ordinate indicates the compressibility (m/mN) on a logarithmic scale in base 10. As can be seen from FIG. 13, the compressibility was $1 \times 10^{-2}$ m/mN or less in the surface pressure range of 3 to 30 mN/m.

In view of the foregoing, the film formation was performed by the LB method at a surface pressure of 22 mN/m. The compressibility at the surface pressure is 0.003 m/mN. Although the film-formable speed at the compressibility was 0.8 mm/s, the actual film formation was performed at 0.3 mm/s. In addition, a photograph of the produced LB film was as shown in FIG. 10A. In other words, the production of a uniform LB alignment film was attained.

Example 2

An example in which film formation was performed with poly(ethylpropiolate) by the LB method is described as Example 2. The polyethyl propiolate is obtained by changing the alkyl group at a side chain in the poly(propylpropiolate) used in Example 1 from a propyl group to an ethyl group, and is a monosubstituted, helical polyacetylene represented by the following structural formula (4).

(4)

Synthesis of the polyethyl propiolate was performed as described below. 47 Milligrams of rhodium (norbornadiene) chloride dimer and 2.6 ml of methanol were loaded into a test tube, and then a mixed liquid of 0.5 g of ethyl propiolate and 2.5 ml of methanol was injected into the mixture with a syringe so that a polymerization reaction might be initiated. The reaction was performed at 40° C. for 24 hours. The precipitated polymer was washed with methanol and filtrated. After that, the resultant was dried in a vacuum. Thus, the target product was obtained at a yield of 59%. The number-average molecular weight (Mn) and molecular weight dispersity (Mw/Mn) of the polymer evaluated by GPC were $4.2 \times 10^4$ and 6.4, respectively.

Figure 14:
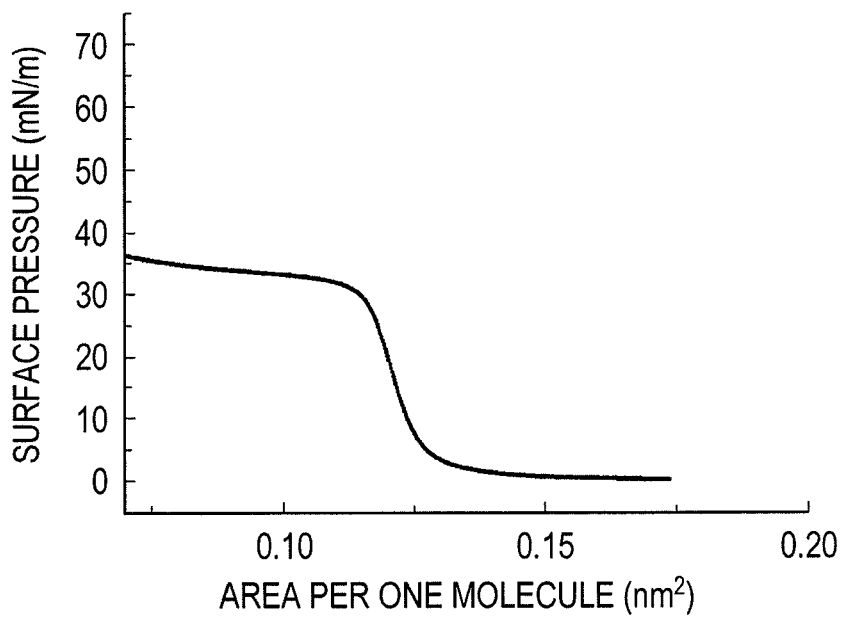
FIG. 14 is a view illustrating the π-A curve of Example 2.

Next, a solution of the polyethyl propiolate in chloroform was prepared. Then, the solution was dropped onto the water surface of the LB trough With a syringe, thereby acquiring an π-A curve. The surface pressure was measured in the same manner as in Example 1 at room temperature (about 20° C.). As a result, a graph illustrated in FIG. 14 was obtained. As in the case of FIG. 12, the axis of abscissa and axis of ordinate of FIG. 14 indicate an area ($nm^2$) occupied per one molecule and the surface pressure (mN/m), respectively. In FIG. 14 as well, points of inflection corresponding to reference numerals 202 and 204 in FIG. 2 appear at 0.13 $nm^2$ and 0.12 $nm^2$, respectively. A compressibility can be determined from the π-A curve by the method described in the foregoing, and is illustrated in FIG. 15.

Figure 15:
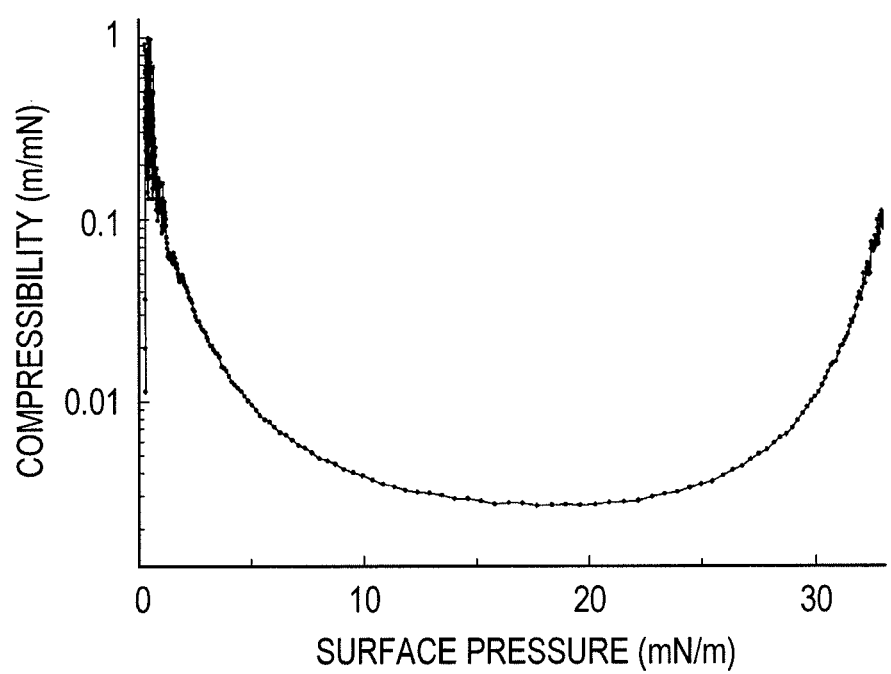
FIG. 15 is a graph illustrating a relationship between a surface pressure and a compressibility in Example 2.

As can be seen from FIG. 15, the compressibility was $1 \times 10^{-2}$ m/mN or less in the surface pressure range of 5 to 30 mN/m. In view of the foregoing, the film formation was performed by the LB method at a surface pressure of 22 mN/m. The compressibility at the pressure is 0.003 m/mN. As a result, it was possible to perform film formation at a film-forming speed of 0.4 mm/s. In addition, a photograph of the produced LB film was as shown in FIG. 10B, the production of a uniform LB alignment film was attained in one half or more of the region where the film formation was performed.

Example 3

This example is an example in which a free standing film was produced with poly(butylpropiolate) represented by the following formula (5) as a helical polyacetylene.

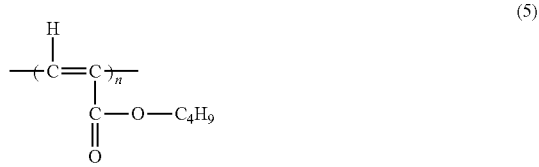

(5)

A free standing film can be produced because the LB film formed under the conditions of the present invention is a high-quality film.

In this example, an Si substrate subjected to a hydrophobic treatment with octadecylamine was used as a substrate.

A solution of the poly(butylpropiolate) in chloroform was prepared. After that, the solution was dropped onto the water surface of an LB trough with a syringe.

Film formation was performed at 23° C. and a surface pressure of 23 mN/m.

As in the case of each of Example 1 and Example 2, the compressibility at the surface pressure was $1 \times 10^{-2}$ m/mN or less, and hence the performance of the film formation at a deposition speed of 0.3 mm/s was attained.

It should be noted that the LB film according to the present invention is aligned in the z direction in FIG. 1A. That is, the film is aligned in the direction in which the substrate is vertically moved.

In the case of the poly(butylpropiolate), after the lamination of 400 or more layers under the conditions, the peeling of the LB film from the substrate was attained. The peeling from the substrate was performed by: attaching a tape perforated with a hole having a diameter of 6 mm to the substrate from above the formed LB film; and peeling the tape. At this time, the direction in which the LB film is peeled is desirably the direction along the alignment direction.

Figure 16:
FIG. 16 is a photograph of a free standing film produced in Example 3.

FIG. 16 shows a photograph of the produced free standing film.

The free standing film thus produced has optical anisotropy, and can be used as an optical thin film.

In addition, a film of such a structure that two alignment directions are arranged in a number sign fashion can be formed by rotating the substrate by 90° every layer or every multiple layers during the formation of the LB film. In this case, there is no particular need to pay attention to the direction in which the LB film is peeled. In addition, a free standing film having an additionally small thickness can be produced.

Such free standing film can find applications in gas-permeable films that selectively allow gases to permeate as well as optical thin films.

Since the film-forming method based on an LB method of the present invention can provide a uniform alignment film using a helical polyacetylene, the method can be utilized for, for example, an optical thin film or electronic device.

According to the present invention, a free standing film of an organic thin film that can be utilized as an optical thin film or gas-permeable film can also be produced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-129418, filed Jun. 4, 2010, which is hereby incorporated by reference herein in its entirety.

What is claimed is:
1. A method of forming a film based on a Langmuir-Blodgett method, comprising:
   developing a helical polyacetylene onto a liquid surface; and
   transferring a monolayer film of the helical polyacetylene formed on the liquid surface onto a substrate to form a film at a film-forming speed between 0.4 mm/s and 2 mm/s, wherein a compressibility P, represented by the following formula (1) at a time of the film formation, is $1\times10^{-2}$ m/mN or less:

$$P=(1/(dH/dS))\times(1/S) \qquad (1)$$

where H represents a surface pressure (mN/m) of the monolayer film of the helical polyacetylene, and S represents an area (m²) of the monolayer film of the helical polyacetylene developed onto the liquid surface.

2. The method according to claim 1, wherein the helical polyacetylene is represented by the following formula (2):

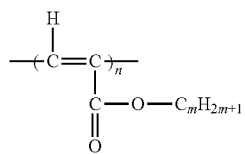

(2)

where n and m each represent an integer.

3. The method according to claim 2, wherein the helical polyacetylene is obtained by setting m in the formula (2) to any one of 2, 3, or 4.

4. The method according to claim 1, wherein the helical polyacetylene is developed onto the liquid surface by dropping the helical polyacetylene dissolved in a solvent onto the liquid surface.

5. The method according to claim 1, wherein the film formation is performed by moving a movable barrier used in film formation by the Langmuir-Blodgett method on the liquid surface.

6. The method according to claim 5, wherein the film formation is performed in a region in a π-A curve obtained by plotting an area against an axis of abscissa and a surface pressure against an axis of ordinate where a ratio of an increase in surface pressure to a reduction in area is sharp.

* * * * *